United States Patent
Wing et al.

(10) Patent No.: US 12,093,356 B2
(45) Date of Patent: Sep. 17, 2024

(54) LOCAL MODEL PROCESSING AND REMOTE VERIFICATION

(71) Applicant: Citrix Systems, Inc., Fort Lauderdale, FL (US)

(72) Inventors: Daniel G. Wing, Santa Clara, CA (US); Asterios Stergioudis, Patras (GR); Manbinder Pal Singh, Fort Lauderdale, FL (US); Pratik Shah, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 736 days.

(21) Appl. No.: 17/171,243

(22) Filed: Feb. 9, 2021

(65) Prior Publication Data
US 2022/0222326 A1 Jul. 14, 2022

Related U.S. Application Data

(63) Continuation of application No. PCT/GR2021/000003, filed on Jan. 12, 2021.

(51) Int. Cl.
*G06F 21/31* (2013.01)
*G06F 11/34* (2006.01)
*G06N 3/04* (2023.01)
*G06N 20/00* (2019.01)

(52) U.S. Cl.
CPC ........ *G06F 21/316* (2013.01); *G06F 11/3438* (2013.01); *G06N 3/04* (2013.01); *G06N 20/00* (2019.01)

(58) Field of Classification Search
CPC ... G06F 11/3438; G06F 21/316; G06N 20/00; G06N 3/08; G06N 3/04
See application file for complete search history.

(56) References Cited

U.S. PATENT DOCUMENTS

| | | | |
|---|---|---|---|
| 2015/0127336 A1 | 5/2015 | Lei et al. | |
| 2015/0261944 A1* | 9/2015 | Hosom | G06F 21/32 726/19 |
| 2018/0129900 A1 | 5/2018 | Kiraly et al. | |
| 2019/0279011 A1 | 9/2019 | Kshirsagar et al. | |

(Continued)

OTHER PUBLICATIONS

International Search Report and Written Opinion issued Oct. 1, 2021 for International Patent Application No. PCT/GR2021/000003.

(Continued)

*Primary Examiner* — Olugbenga O Idowu

(57) ABSTRACT

A method may include receiving, by a computing system and from a first device, first data. The first data may be based at least in part on a first output from a first instance of a model processed by the first device. The method may further include receiving, by the computing system and from the first device, second data that was processed by the first instance of the model to produce the first output. The method may also include processing, by the computing system, the second data with at least a portion of a second instance of the model to produce a second output. The method may additionally include determining, by the computing system, third data based at least in part on the second output. Further, the method may include determining, by the computing system, that the third data is consistent with the first data.

17 Claims, 9 Drawing Sheets

(56) References Cited

U.S. PATENT DOCUMENTS

2020/0210472 A1  7/2020 Das et al.
2021/0099303 A1* 4/2021 Wang ...................... G10L 17/06

OTHER PUBLICATIONS

A. Peacock, et al.; "Typing patterns: a key to user identification", IEEE Security & Privacy, vol. 2, No. 5, Sep.-Oct. 2004, p. 40-47.
E. Alsolami; "An Examination of Keystroke Dynamics for Continuous User Authentication", Information Security Institute, Aug. 2012, p. 1-183.
F. Monrose, et al.; "Keystroke dynamics as a biometric for authentication", Future Generation Computer Systems, vol. 16, Issue 4, 2000, p. 351-359.
F. Monrose, et al.; "Authentication via Keystroke Dynamics"; Proceedings of the 4th ACM Conference on Computer and Communications Security, 1997, p. 48-56.
Patil, et al., "Keystroke dynamics for user authentication and identification by using typing rhythm," International Journal of Computer Applications, vol. 144, No. 9, Jun. 2016, p. 27-33.

* cited by examiner

LOCAL MODEL PROCESSING AND REMOTE VERIFICATION

CROSS-REFERENCE TO RELATED APPLICATIONS

This application is a continuation of and claims the benefit under 35 U.S.C. § 120 and 35 U.S.C. § 365(c) to International Application PCT/GR2021/000003, entitled LOCAL MODEL PROCESSING AND REMOTE VERIFICATION, with an international filing date of Jan. 12, 2021, the entire contents of which are incorporated herein by reference for all purposes.

BACKGROUND

Models such as artificial intelligence (AI) models may be designed and trained to process data for various classification and decision making purposes. For example, a neural network model may include an input layer that may process input data (e.g., based on weighted calculations) to produce output data. The output data may be processed with a subsequent layer of the model to produce further output data which may be input into another layer of the model for processing, and so on. In this way, several layers of the model may process data output from previous layers until a final layer of the model outputs data useful to make a classification or decision.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method may include receiving, by a computing system and from a first device, first data. The first data may be based at least in part on a first output from a first instance of a model processed by the first device. The method may further include receiving, by the computing system and from the first device, second data that was processed by the first instance of the model to produce the first output. The method may also include processing, by the computing system, the second data with at least a portion of a second instance of the model to produce a second output. The method may additionally include determining, by the computing system, third data based at least in part on the second output. Further, the method may include determining, by the computing system, that the third data is consistent with the first data. Moreover, the method may include determining, based at least in part on the third data being consistent with the first data, that the first data was determined using the first instance of the model.

In some disclosed embodiments, a method may include processing, by a first device, first data with a first instance of a model to produce a first output. The method may further include determining, by the first device, second data that is based at least in part on the first output. The method may also include sending, from the first device to a computing system, the first data and the second data so as to cause the computing system to process the first data with at least a portion of a second instance of the model to produce a second output, determine third data based at least in part on the second output, determine that the third data is consistent with the second data, and determine, based at least in part on the third data being consistent with the second data, that the second data was determined using the first instance of the model.

In some disclosed embodiments, a computing system may include at least one processor, and at least one computer-readable medium encoded with instructions which, when executed by the at least one processor, cause the computing system to receive, from a first device, first data. The first data may be based at least in part on a first output from a first instance of a model processed by the first device. The instructions may further cause the computing system to receive, from the first device, second data that was processed by the first instance of the model to produce the first output. The instructions may also cause the computing system to process the second data with at least a portion of a second instance of the model to produce a second output. The instructions may additionally cause the computing system to determine third data based at least in part on the second output. Further, the instructions may cause the computing system to determine that the third data is consistent with the first data. Moreover, the instruction may case the computing system to determine, based at least in part on the third data being consistent with the first data, that the first data was determined using the first instance of the model.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
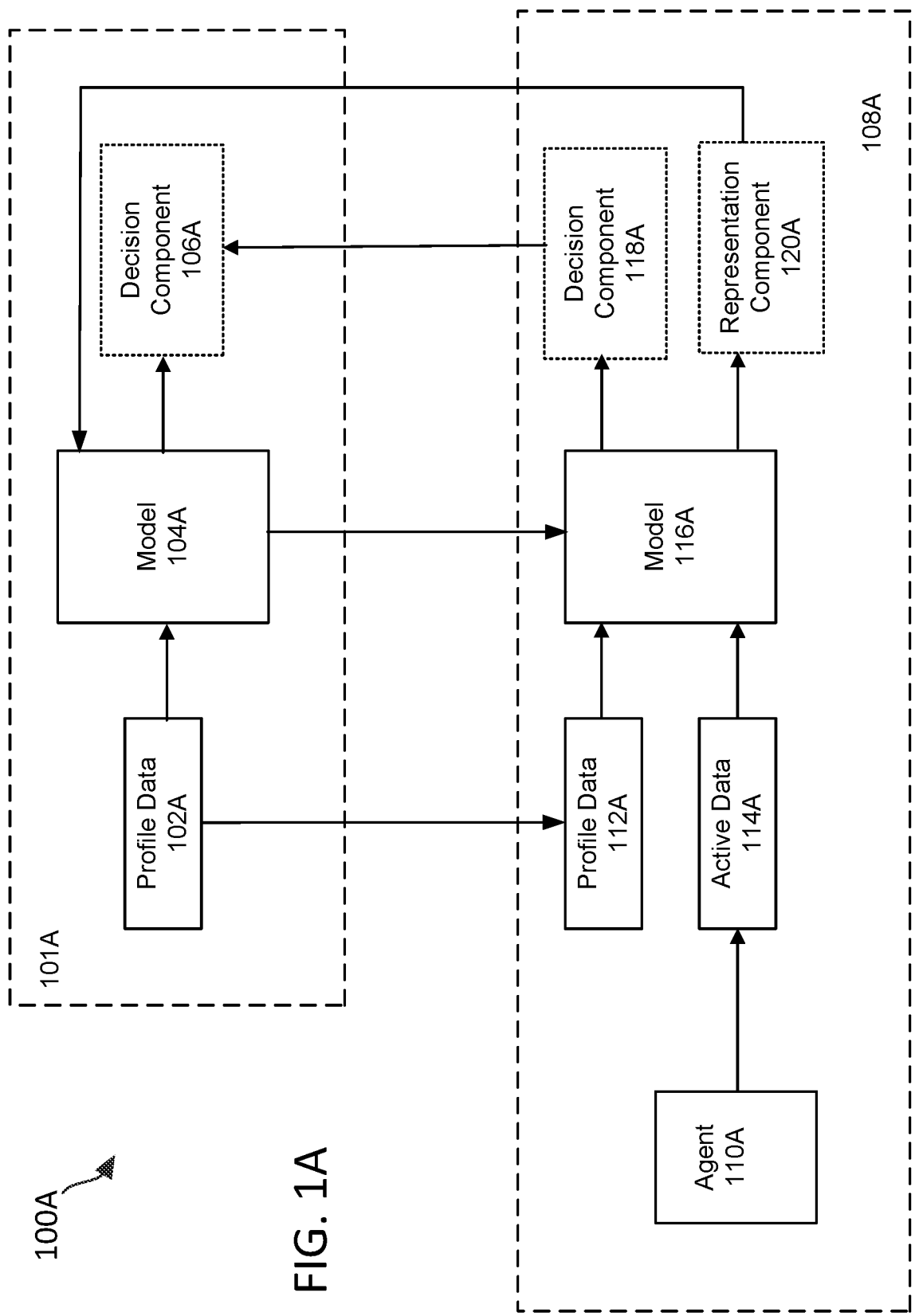
FIG. 1A is a diagram showing example components of a first illustrative model processing and verification system in accordance with some aspects of the present disclosure.

For purposes of reading the description of the various embodiments below, the following descriptions of the sections of the specification and their respective contents may be helpful:

Section A provides an introduction to example embodiments of model processing and verification systems configured in accordance with some aspects of the present disclosure;

Section B describes a network environment which may be useful for practicing embodiments described herein;

Section C describes a computing system which may be useful for practicing embodiments described herein;

Section D describes a cloud computing environment which may be useful for practicing embodiments described herein;

Section E provides a more detailed description of example embodiments of the model processing and verification systems introduced above in Section A; and Section F describes example implementations of methods, systems/devices, and computer-readable media in accordance with the present disclosure.

A. Introduction to Illustrative Embodiments of Model Processing and Verification Systems As discussed above, several layers of a model (e.g., a neural network) may process data output from respective previous layers, until a final layer of the model outputs data useful to make a classification or decision. In some situations, the original input data of the model may be received at a client device and sent to a server which may use the model to process the original input data.

For example, comparing active data (e.g., data received at a client device from peripheral devices such as a keyboard, mouse, microphone, or camera, etc.) to profile data (e.g., data indicative of various physical and/or behavioral characteristics of a user or one or more devices operated by the user) through model processing may be useful for classification, identification, or decision making purposes (e.g., user identification, speech/audio recognition, image/object recognition, etc.). Model processing for comparison or analysis of the active data and the profile data may be performed remote from the client device at a server or other computing system for many reasons (e.g., data centralization, control, business reasons, etc.), but there may be disadvantages. These disadvantages may include privacy and security disadvantages as it may not be desirable to send sensitive active data (e.g., keyboard/mouse user data, speech/audio data, or image data, etc.) from the client device to the server. For example, if the comparison protocol for the active and profile data is simple, the protocol may be spoofed. Further, processing data with models (e.g., neural networks or machine learning models) may require significant computer processing resources and/or network bandwidth.

Using the techniques and features described in the present disclosure for model processing and verification, various privacy and security advantages, and/or processing and network scalability advantages, may be realized. Model processing for comparison or analysis of active data and profile data may be performed at the client device itself such that the active data (or most of the active data) need not leave the client device and more of the processing and/or network bandwidth may be consumed at the client device rather than at the server.

Figure 2:
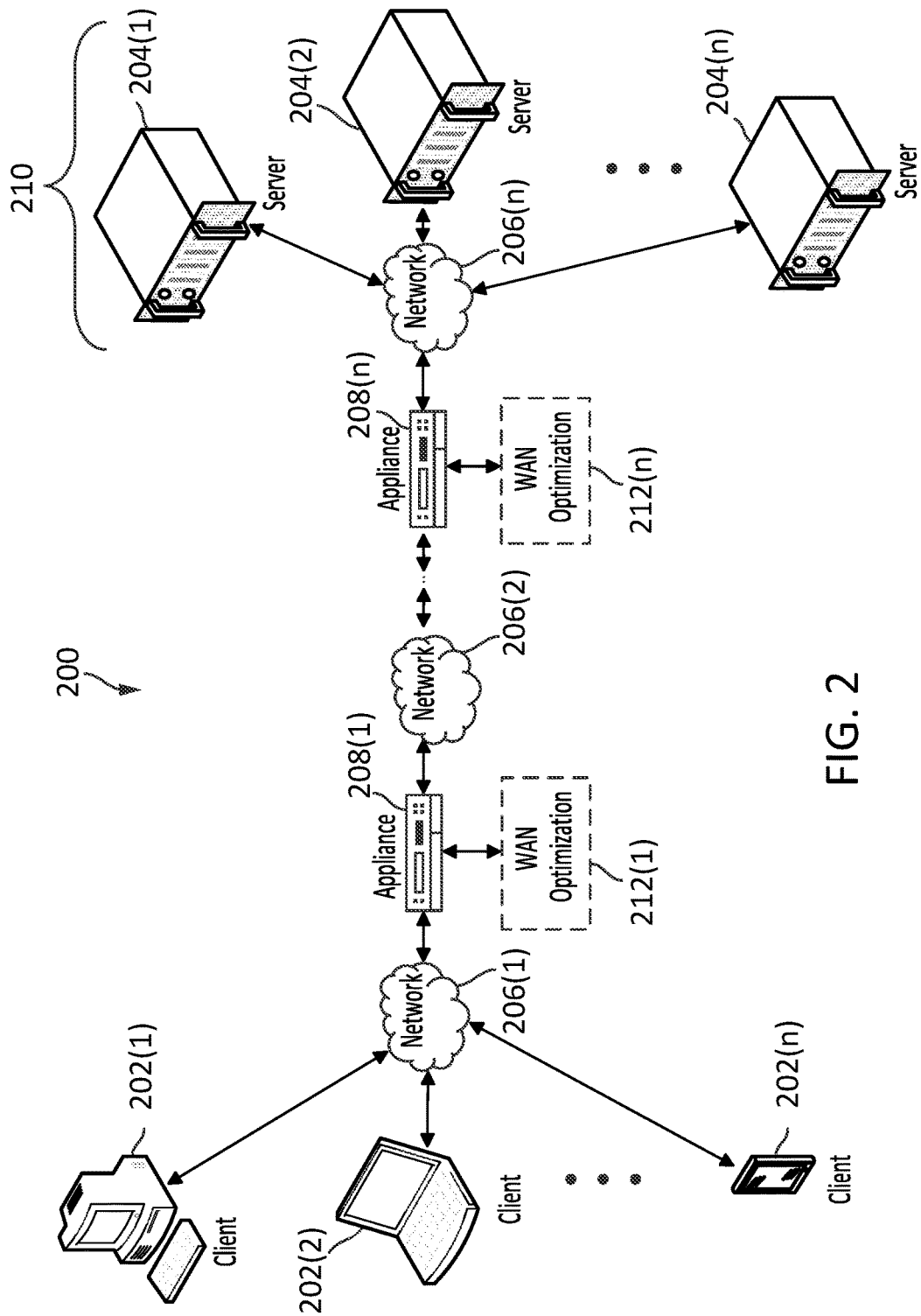
FIG. 2 is a diagram of a network environment in which some components of model processing and verification systems disclosed herein may be deployed.

Referring now to FIG. 1A, example components of a first illustrative model processing and verification system 100A in accordance with aspects of the present disclosure are shown. As illustrated, the system 100A may include a computing system (e.g., one or more servers 101A) and a first device (e.g., a client device 108A). Referring also to FIG. 2, the server(s) 101A may be one or more of servers 204(1)-204(n) or may be similar to servers 204(1)-204(n). Further, client device 108A may be any one of clients 202(1)-202(n) or may be similar to clients 202(1)-202(n).

As shown in FIG. 1A, the server(s) 101A may include a model 104A (e.g., a neural network model) and may store profile data 102A (e.g., data indicative of various physical and/or behavioral characteristics of a user of the client device 108A and/or of the client device 108A itself). As explained in more detail below, in some implementations, the model 104A may be a copy or instance of at least a portion of a model 116A that is used by the client device 106A to make a classification or decision. The server(s) 101A may also include a decision component or module 106A that may determine a classification or decision based on output from the model 104A. It should be noted that the decision component 106A is shown separate from model the 104A for illustrative purposes only and the decision component 106A may be incorporated into the model 104A or be part of the model 104A in some implementations or embodiments of the present disclosure.

The client device 108A may include an agent 110A and may store profile data 112A. In some implementations, the profile data 112A may be the same as or similar to the profile data 102A that is maintained by the server(s) 101A. The profile data 102A, 112A may be used, for example, to tailor the processing that is done by the models 104A, 116A to the physical and or behavioral characteristics of a particular end user and/or client device 108A. The agent 110A may collect data received at the client device 108A from, for example, peripheral devices such as a keyboard, mouse, microphone, or camera (not shown). The collected data may be stored as active data 114A. The client device 108A may also include a model 116A which may receive the profile data 112A and the active data 114A as input. It should be noted that the peripheral devices listed above are listed for example purposes only and data from other peripheral devices or sources of data that may be input into the model 116A (or used to determine the input) are within the scope of the present disclosure.

The client device 108A may also include a decision component or module 118A that may determine a classification or decision based on output from model 116A. Further, the client device 108A may include a representation component or module 120A which may receive, store, and/or send a representation of at least a portion of the data that is processed by the model 116A to make a classification or decision. It should be noted that the decision component 118A and the representation component 120A are shown separate from the model 116A for illustrative purposes only and one or both of the decision component 118A and the representation component 120A may be incorporated into the model 116A or be part of the model 116A in some implementations or embodiments of the present disclosure.

In some implementations, the client device may be a remote system accessed from an endpoint via a virtual channel (e.g., via High-Definition User Experience (HDX)/Independent Computing Architecture (ICA) display remoting protocol). For example, a virtual desktop session may be delivered from the remote system as a service to the endpoint (e.g., a user computing device) along with various applications used on the virtual desktop.

Figure 1B:
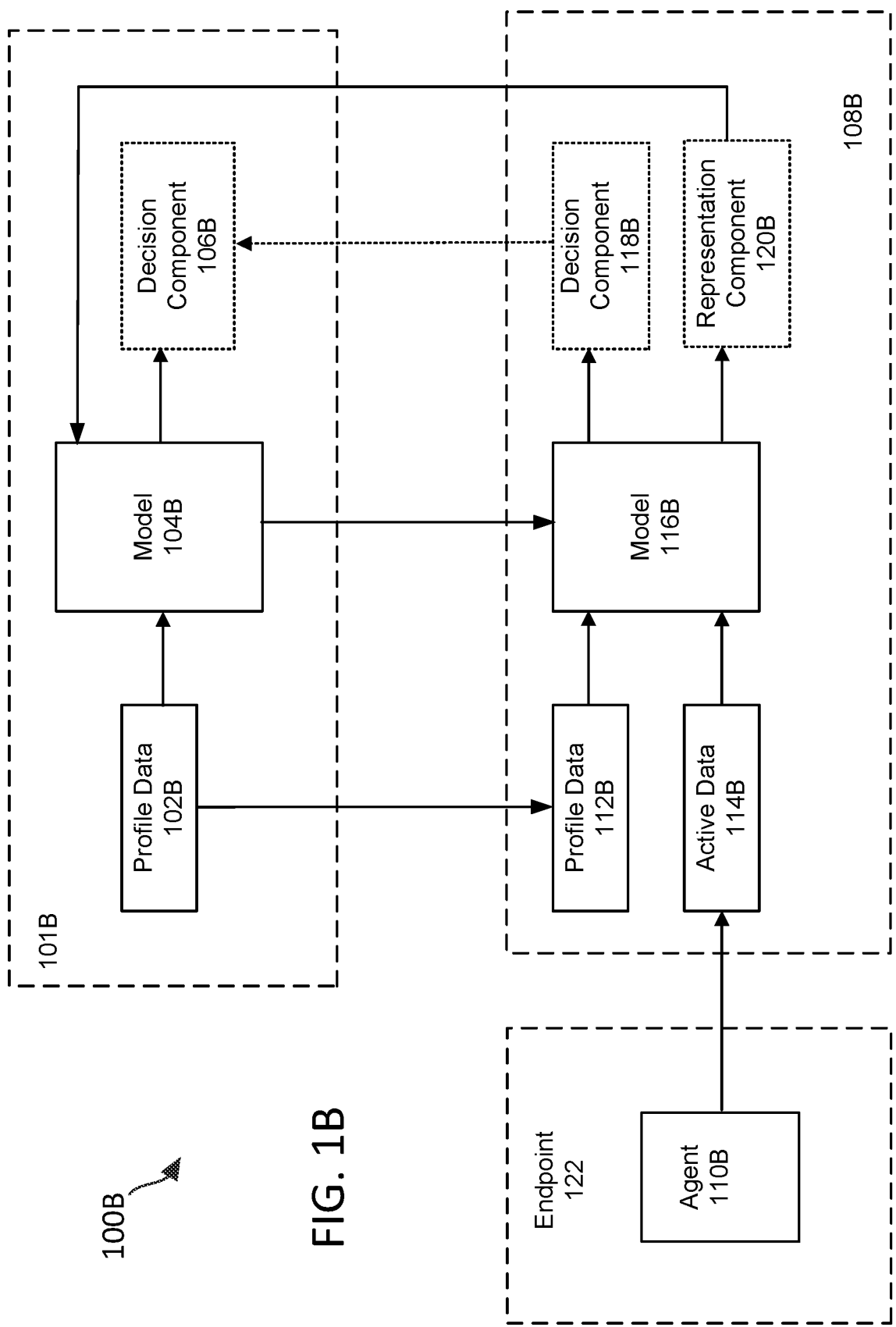
FIG. 1B is also a diagram showing example components of a second illustrative model processing and verification system in accordance with some aspects of the present disclosure.

Referring now to FIG. 1B, example components of a second illustrative model processing and verification system 100B in accordance with aspects of the present disclosure are shown, where an endpoint 122 may include an agent 110B which may be similar to the agent 110A. However, the agent 110B may reside outside of the client device 108B (e.g., as a component of a remote system) on the endpoint 122. Similar to the system 100A, the system 100B may include a computing system (e.g., one or more servers 101B) and a first device (e.g., a client device 108B). Referring also to FIG. 2, the server(s) 101B may be one or more of servers 204(1)-204(n) or may be similar to the servers 204(1)-204(n). Further, client device 108B may be any one of clients 202(1)-202(n) or may be similar to the clients 202(1)-202(n). As noted above, the endpoint 122 may access the client device 108B via a virtual channel (e.g., via an HDX/ICA display remoting protocol) and a virtual desktop session may be delivered from the client device 108B as a service to the endpoint 122 along with various applications used on the virtual desktop. The endpoint 122 may be any type of user computing device such as a desktop, laptop, tablet, smartphone, or the like.

As shown in FIG. 1B, the server(s) 101B may include a model 104B (e.g., a neural network model) and may store profile data 102B (e.g., data indicative of various physical and/or behavioral characteristics of a user of the endpoint 122, the endpoint 122 itself, and/or the client device 108B). As explained in more detail below, in some implementations, the model 104B may be a copy or instance of at least a portion of a model 116B that is used by the client device 106B to make a classification or decision. The server(s) 101B may also include a decision component or module 106B that may determine a classification or decision based on output from the model 104B. It should be noted that the decision component 106B is shown separate from the model 104B for illustrative purposes only and the decision component 106B may be incorporated into the model 104B or be part of the model 104B in some implementations or embodiments of the present disclosure.

The client device 108B may receive data from the agent 110B (e.g., over a network or the Internet via the virtual channel) and may store profile data 112B. In some implementations, the profile data 112B may be the same as or similar to the profile data 102B that is maintained by the server(s) 101B. The profile data 102B, 112B may be used, for example, to tailor the processing that is done by the models 104B, 116B to the physical and/or behavioral characteristics of a particular end user, a particular client device 108B, and/or a particular endpoint 122. The agent 110B may collect data received at the endpoint 122 from, for example, peripheral devices such as a keyboard, mouse, microphone, or camera (not shown) and send the collected data to the client device 108B where it may be stored as active data 114B. The client device 108B may also include a model 116B which may receive the profile data 112B and the active data 114B as inputs. It should be noted that the peripheral devices listed are listed for example purposes only and data from other peripheral devices or sources of data that may be input into the model 116B (or used to determine the input) are within the scope of the present disclosure.

The client device 108B may also include a decision component or module 118B that may determine a classification or decision based on output from the model 116B.

Further, the client device 108B may include a representation component or module 120B which may receive, store, and/or send a representation of at least a portion of the data that is processed by the model 116B to make a classification or decision. It should be noted that the decision component 118B and the representation component 120B are shown separate from the model 116B for illustrative purposes only and one or both of the decision component 118B and the representation component 120B may be incorporated into the model 116B or be part of the model 116B in some implementations or embodiments of the present disclosure.

Referring now to both FIG. 1A and FIG. 1B, as noted above, the profile data 102 may be specific to a particular end user, client device, and/or endpoint, and may be used to tailor the processing that is done by the models 104, 116 based on the characteristics indicated by that data. In some implementations, for example, the profile data 102 may be indicative of an average typing speed (e.g., in words-per-minute), average key-press duration, average duration between key presses, keyboard rollover (e.g., pressing two keys at same time), average mouse pointer velocity, etc., of a particular user, or other characteristics of that sort. The models 104, 116 may be neural networks capable of processing data for making classifications or decisions based on a combination of the profile data 102 or features determined therefrom and the active data 114 or features determined therefrom. The profile data 102 and the trained models 104, 116 may be synchronized to the client device 108 when the client device 108 is in communication with the server(s) 101.

In some implementations, the profile data 112 that is received from the server(s) 101 and stored at the client device 108 may be a subset of a larger set of the profile data 102 at the server(s) 101. For example, the profile data 102 at the server(s) 101 may be for a number of users and the profile data 112 sent to the client device 108 during a synchronization process may be for a single user of the client device 108 or the endpoint 122. In some implementations, the profile data 102, 112 may include features determined or calculated based on previously collected active data 114 for a particular end user, client device 108 and/or endpoint 122.

As discussed above, the client device 108 may receive data from peripheral devices (e.g., keyboard, mouse, microphone, or camera, etc.) via the agent 110 as the active data 114. The client device 108 may perform operations or calculations on the active data 114 to determine features of the data (e.g., an input feature vector) which may be input to the model 116. The operations or calculations may be performed by the agent 110, by the model 116, or by the client device 108 outside the agent 110 and the model 116. In some implementations, the active data 114 itself may be an input feature vector for the model 116.

In some implementations, the output of the model 116 may include a decision or classification indicative of whether the active data 114 (and/or input features determined therefrom) is consistent with the manner in which a particular end user (e.g., the end user associated with the profile data 112) would typically operate the client device 108 or endpoint 122. In some implementations, the output may include data sufficient for the decision component 118 to make a decision as to whether the active data 114 indicates the client device 108 or endpoint 122 is being operated by an authorized end user. The decision or classification may be sent to the server(s) 101 periodically, occasionally, continuously, or otherwise.

In this regard, the inventors have recognized and appreciated that sending such decision or classification decisions to the servers(s) 101 in this fashion may create a security or privacy issue. For example, the decision or classification may be spoofed by an attacker and the integrity of the decision or classification may be breached such that it is no longer useful for its intended purpose (e.g., user identification, speech/audio recognition, image/object recognition, etc.) An unauthorized end user may, for instance, trick the system into thinking the end user is authorized simply by fabricating and periodically transmitting a decision or classification to the server 101 that mimics a decision or classification indicative of the end user being "cleared" as an authorized user.

To ensure the integrity of the decision or classification process, the model 116 may also output a representation of at least a portion of the data that was processed by the model 116 to reach the decision or classification, and the client device 108 may send that representation to the server(s) 101. In some implementations, the representation component 120 may be responsible for sending such representations to the server(s) 101. The representations may, for example, be a feature vector input to the model 116 and/or an output of an intermediate processing step of the model 116. In some implementations, for example, the model may be a neural network model and the representation may be the output of a hidden layer of the neural network model. As such, the representation may be an encoded representation of the active data 114. Such an encoded representation may be a vector of real numbers which may not provide any useful information outside the model 116. Thus, an attacker may not be able to spoof values of the encoded representation.

The client device 108 may periodically, occasionally, or continuously send the representation to the server(s) 101. The representation may, for example, be sent with the decision or classification but less often than the decision or classification, as the representation may be used to periodically, occasionally, or continuously verify the decision or classification. For example, the decision or classification may be sent from the client device 108 to the server(s) 101 every "N" seconds, and the representation may be sent from the client device 108 to the server(s) 101 every "M" seconds, where "M" is greater than or equal to "N."

As noted above, the model 104 at the server(s) 101 may be a copy or instance of at least a portion of the model 116. As such, the model 104 may be configured to process the representation received from the client device 108 in the same way as the model 116 processed that same representation to yield the decision or classification that the decision component 118 sent to the server(s) 101. Thus, the server(s) 101 may verify whether the decision or classification that was calculated or determined at the client device 108 has been spoofed by comparing it against the decision or classification that was calculated or determined by the server(s) 104, which used the representation as input. This comparison and verification may be performed, for example, by the decision component 106. As shown in FIGS. 1A and 1B, the decision component 106 may receive both (A) the output of the model 104 that processed the representation received from the client device 108, and (B) the decision or classification from the client device 108 (e.g., from the decision component 118).

Additionally, in some implementations, the model 104 may include and/or be configured to implement only the portion of the model 116 (e.g., the last hidden layer of a neural network model) that is needed to yield a decision or classification based on the representation received from the client device 108. As such, the server(s) 101 may consume less processing capability and/or network bandwidth than they would otherwise need to process the active data 114 and the profile data 112 through the entirety of the model 116. Thus, the techniques and features described in the present disclosure may ensure security and privacy of user data and scalability by processing analytics with the model 116 at the client device 108, and also protect against spoofing of the decision or classification by verifying the decision or classification at the server(s) 101. As only the decision or classification and representation are sent from the client device 108 to the server(s) 101, the user data from the peripheral devices need not be sent to the server(s) 101. Even if an attacker were to access the representation (e.g., encoded data from a hidden layer of a neural network) sent to the server(s) 101, the representation may not provide useful information as it may not be possible to determine the original user data from the representation.

Additional details and example implementations of embodiments of the present disclosure are set forth below in Section E, following a description of example systems and network environments in which such embodiments may be deployed.

B. Network Environment

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), interne protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over interne protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
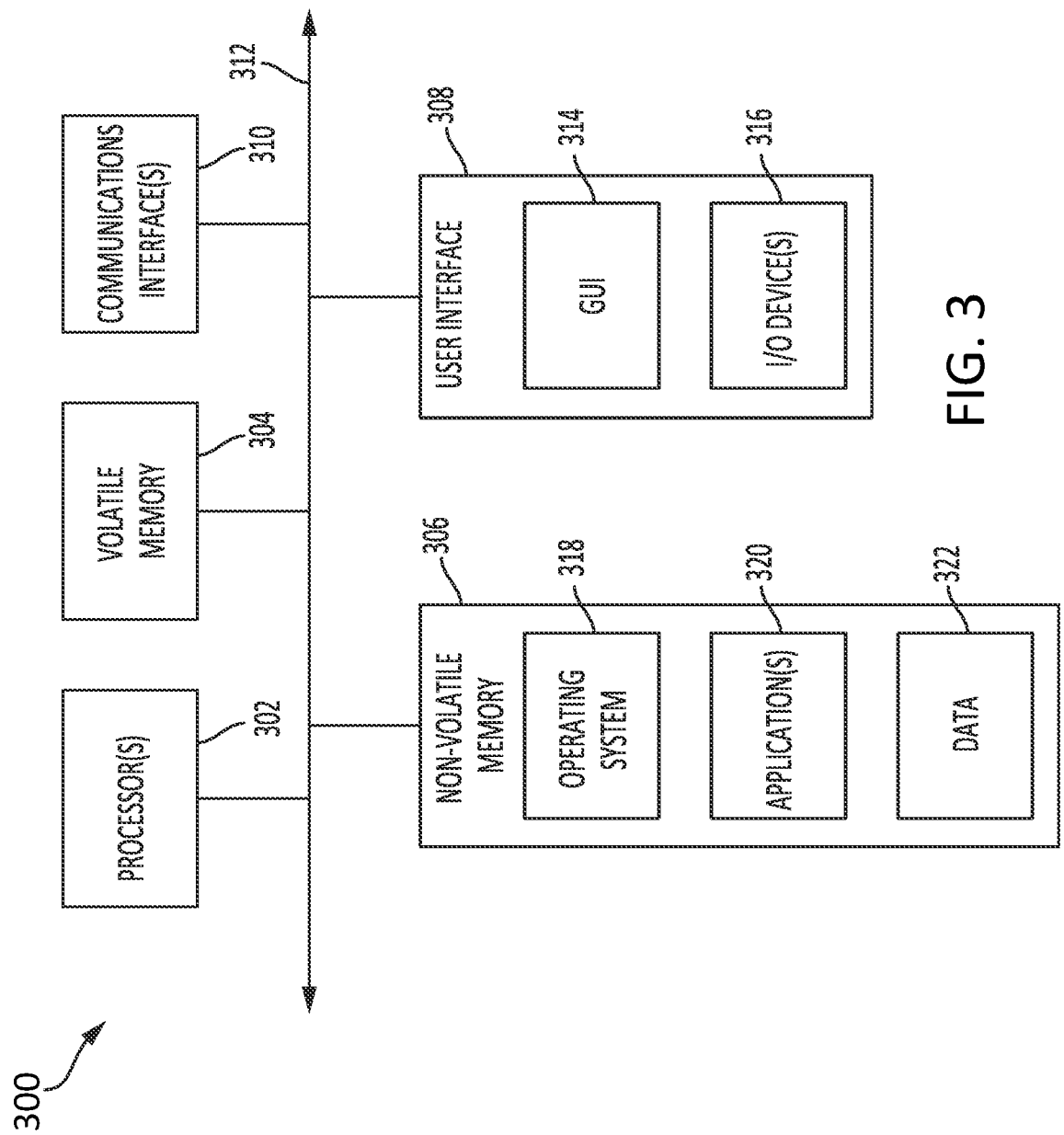
FIG. 3 is a diagram of an example computing system that may be used to implement one or more components of the network environment shown in FIG. 2.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Cloud Computing Environment

Figure 4:
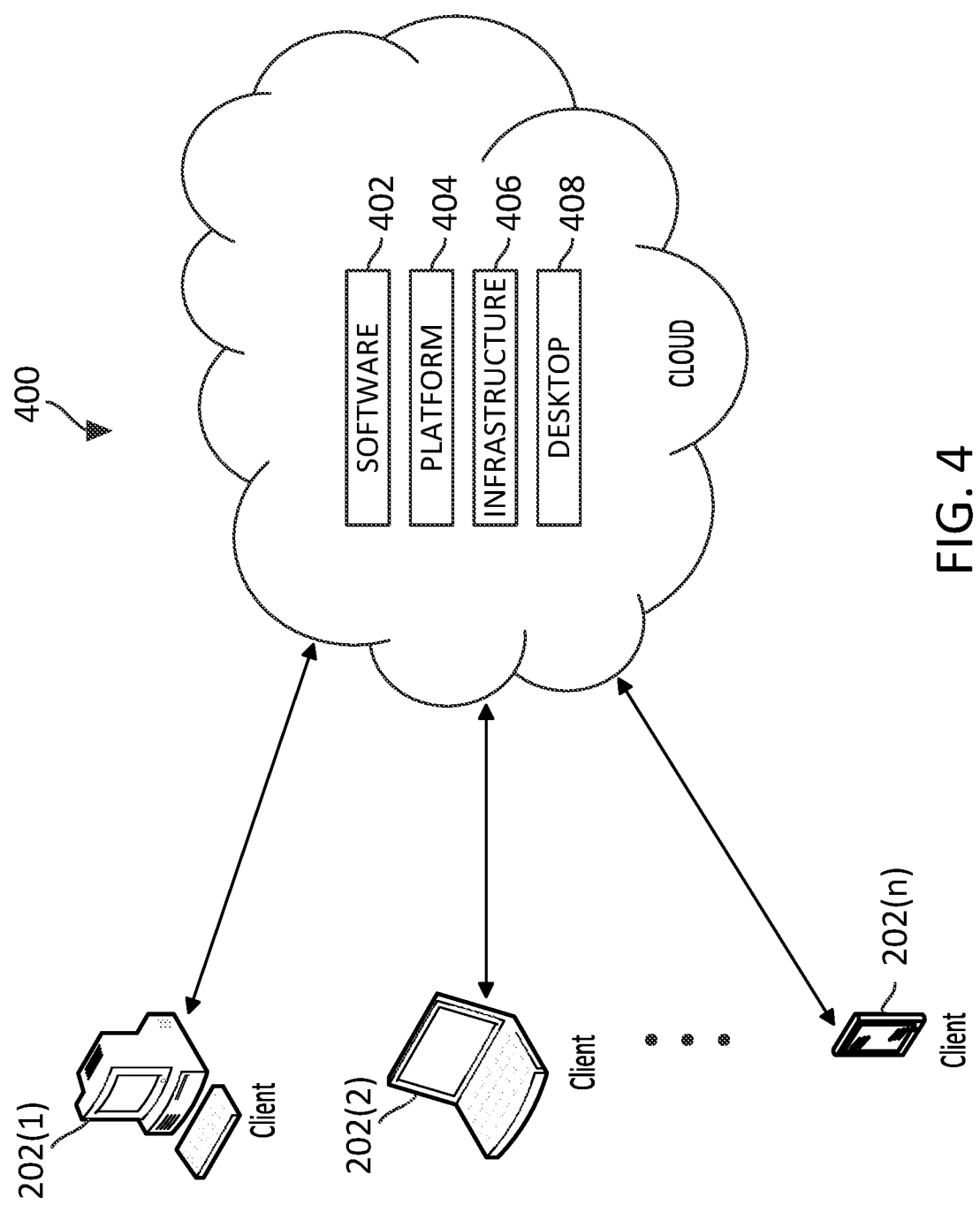
FIG. 4 is a diagram of a cloud computing environment in which various aspects of the disclosure may be implemented.

Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Detailed Description of Example Embodiments of Model Processing and Verification Systems As discussed above in Section A, a model processing and verification system in accordance with the present disclosure may provide several advantages. The techniques and features of the present disclosure will be described below in the context of determining or confirming user identity based on keyboard and/or mouse usage dynamics. It should be noted, however, that this is for illustrative purposes only and the examples provided below in connection with user identity based on keyboard and/or mouse usage dynamics are not intended to limit the scope of the present disclosure. The techniques and features of the present disclosure may be applied to the processing of analytics and models (and related verification) in various contexts besides keyboard and/or mouse usage dynamics, including, but not limited to, speech/audio recognition, image/object recognition, etc.

Evaluating keystroke and mouse dynamics (such as keypresses and mouse movements) of a user to determine whether such actions are consistent with the expected behavior of the user may be useful for identifying the user and/or confirming an identity of the user. As described in connection with FIGS. 1A and 1B, for example, such evaluation of keyboard and mouse dynamics may allow the identity of a user of a client device (e.g., client device 108A) or endpoint (e.g., the endpoint 122) to be verified. Keystroke and mouse dynamics may include features or data points such as keypress duration, duration between key presses, keyboard rollover (e.g., pressing two keys at same time), velocity of a mouse pointer or similar for a particular user. Evaluation of these types of keyboard and mouse dynamics may be done remotely at a server for many reasons, but some disadvantages of such an approach may include privacy (e.g., sending every keystroke from the client device to the server), fate-sharing with the network, and using server processing and network resources and bandwidth.

Further, if evaluation of keystroke and mouse movements is performed remotely at the server(s) 101 and the comparison or communication protocol is simple (e.g., determining and notifying that the user's keypresses match every "5" seconds), the protocol may be spoofed by an attacker and continuous identification may be compromised. Using the techniques and features described in the present disclosure, evaluation of the user's keystroke and mouse movements or related features may be performed on a physical device (e.g., the client device 108A) in front of the user that is connected (wired or wirelessly) to the keyboard and mouse, or on a device (e.g., the client device 108B) accessed by the user through an endpoint (e.g., the endpoint 122) that is connected (wired or wirelessly) to the keyboard and mouse. This approach may allow for improved user privacy (i.e., the actual keystroke information is not sent to the server) and improved scalability (i.e., more processor and network bandwidth may be consumed by the client than the server).

In some implementations, keyboard and mouse reference profiles may be produced for users during a registration. The profiles for a user may be for different keyboards or mice. Unique profiles may exist on an application by application basis. For example, a user may have a keyboard and/or mouse profile for a spreadsheet application and a different keyboard and/or mouse profile for a word processing application. Further, the user may have a profile for daytime (or even daytime use of a particular application) and a different profile for nighttime (or nighttime use of the particular application). These profiles may be referred to as user profiles, reference profiles, or user reference profiles, and may include profile data. Once the user profiles are produced, they may be used to train a model (e.g., a neural network model or machine learning model). The model may be processed with the profile data 112 and the active data 114 (i.e., recent or current keyboard and mouse usage data received by, e.g., the agent 110) to determine whether the recent or current keystroke and/or mouse usage patterns are representative of the same user as indicated by the profile data.

Referring to FIGS. 1A and 1B, reference profiles for a user (e.g., the profile data 112) and the trained model (e.g., the model 116) may be synchronized or copied from the server(s) 101 to the client device 108 when the user performs a login or when the client device 108 is otherwise connected to or in communication with the server(s) 101. The client device 108 may collect or receive the user's current (or recent) keystrokes and/or mouse movements periodically, occasionally, or continuously on its own (e.g., if the client device 108 is in front of the user such as the client device 108A) or via a virtual channel (e.g., if the client device is accessed via an endpoint such as the endpoint 122). The collected keystrokes and/or mouse movements may be referred to as "active data" (e.g., the active data 114). The client device 108 may calculate or determine features of the keystrokes and mouse movements (active data) of the user periodically, occasionally, or continuously. Examples of such features may include, but are not limited to, average time between two consecutive keypresses, number of times the user presses a key before releasing the previous key, average velocity of the mouse pointer, etc. These features are provided for illustrative purposes only and are not intended to limit the scope of the present disclosure as other features may be calculated or determined. The features or other data or information determined from the active data 114, which may be referred to as current features, may be processed by the model 116. The model 116 may evaluate the features against the user's reference profile (e.g., the profile data 112).

The model 116 may output a decision or classification (or data sufficient to determine a decision or classification by the decision component 118). The decision may be a binary decision (e.g., true/false) as to whether the current features match or are consistent with data from the user's reference profile(s). The decision may be determined periodically, occasionally, or continuously as current feature data is input into model, and may be periodically, occasionally, or continuously sent from the client device 108 to the server(s) 101. As discussed above, this may create a security issue where the decision may be spoofed by an attacker and continuous identification may be interrupted, or false decisions may be provided by the attacker.

To overcome potential security issues, the model 116 may also output a representation of at least a portion of the data that was processed by the model 116 to reach the decision or classification, and the client device 108 may send that representation to the server(s) 101. In some implementations, the representation component 120 may be responsible for sending such representations to the server(s) 101. The representations may, for example, be a feature vector input to the model 116 and/or an output of an intermediate processing step of the model 116. In some implementations, for example, the model may be a neural network model and the representation may be the output of a hidden layer (e.g., the last hidden layer) of the neural network model. As such, the representation may be an encoded representation of the active data 114. Such an encoded representation may be a vector of real numbers which may not provide any useful information outside the model 116. Thus, an attacker may not be able to spoof values of the encoded representation.

As discussed above, the decision or classification based on the output of the model 116 may be sent from the client device 108 to the server 110 periodically, occasionally, or continuously such as, for example, every "N" seconds. Further, the client device 108 may send the representation (e.g., the output of a hidden layer of the model 116) to the server(s) 101 every "M" seconds, where "M may be greater than or equal to "N." The representation may, for example, be sent to the server(s) 101 along with the decision or classification. The model 104 at the server(s) 101 may be a copy or instance of at least a portion of the model 116. As such, the model 104 may be configured to process the representation received from the client device 108 in the same way as the model 116 processed that same representation to yield the decision or classification that the decision component 118 sent to the server(s) 101. Thus, the server(s) 101 may verify whether the decision or classification that was calculated or determined at the client device 108 has been spoofed by comparing it against the decision or classification that was calculated or determined by the server(s) 104, which used the representation as input. This comparison and verification may be performed, for example, by the decision component 106. As shown in FIGS. 1A and 1B, the decision component 106 may receive both (A) the output of the model 104 that processed the representation received from the client device 108, and (B) the decision or classification from the client device 108 (e.g., from the decision component 118).

By using the model 116 to process the profile data 112 and active data 114 (or input features determined therefrom) on the client device 108 and sending both the decision and the representation to the server(s) 101 for verification, security and privacy may be ensured because the actual keystrokes and mouse movements of the user need not be sent to the server(s) 101. Further, by using the model 116 to process the profile data 112 and the active data 114 (or input features determined therefrom) on the client device 108 and sending both the decision and representation to the server(s) 101 for verification, enhanced scalability may be achieved because most or all of the model 116 may be processed using the resources of the client device 108 and only the final layer or last layer(s) of the model 116 (e.g., represented by the model 104) need be processed by the server(s) 101. Even if an attacker was able to access the representation sent to the server(s) 101, the attacker would likely be unable to determine the keystrokes and mouse movements of the user because it may not be possible to retrieve raw keystrokes and mouse movements from the representation. Further, even if the attacker was able access to both the representation and a copy of the model, the attacker may only manage to retrieve the values of the input features (e.g. average key press time) but not the actual keystrokes and mouse movements of the user.

Various techniques and features may be used to produce the representation that the representation component 120 sends to the server(s) 101. For example, a fully-connected feed-forward neural network (FCNN) may be used. This is not intended to be a limitation of the present disclosure as other models and neural networks may also be used, including but not limited to recurrent neural networks and convolutional neural networks.

Figure 5:
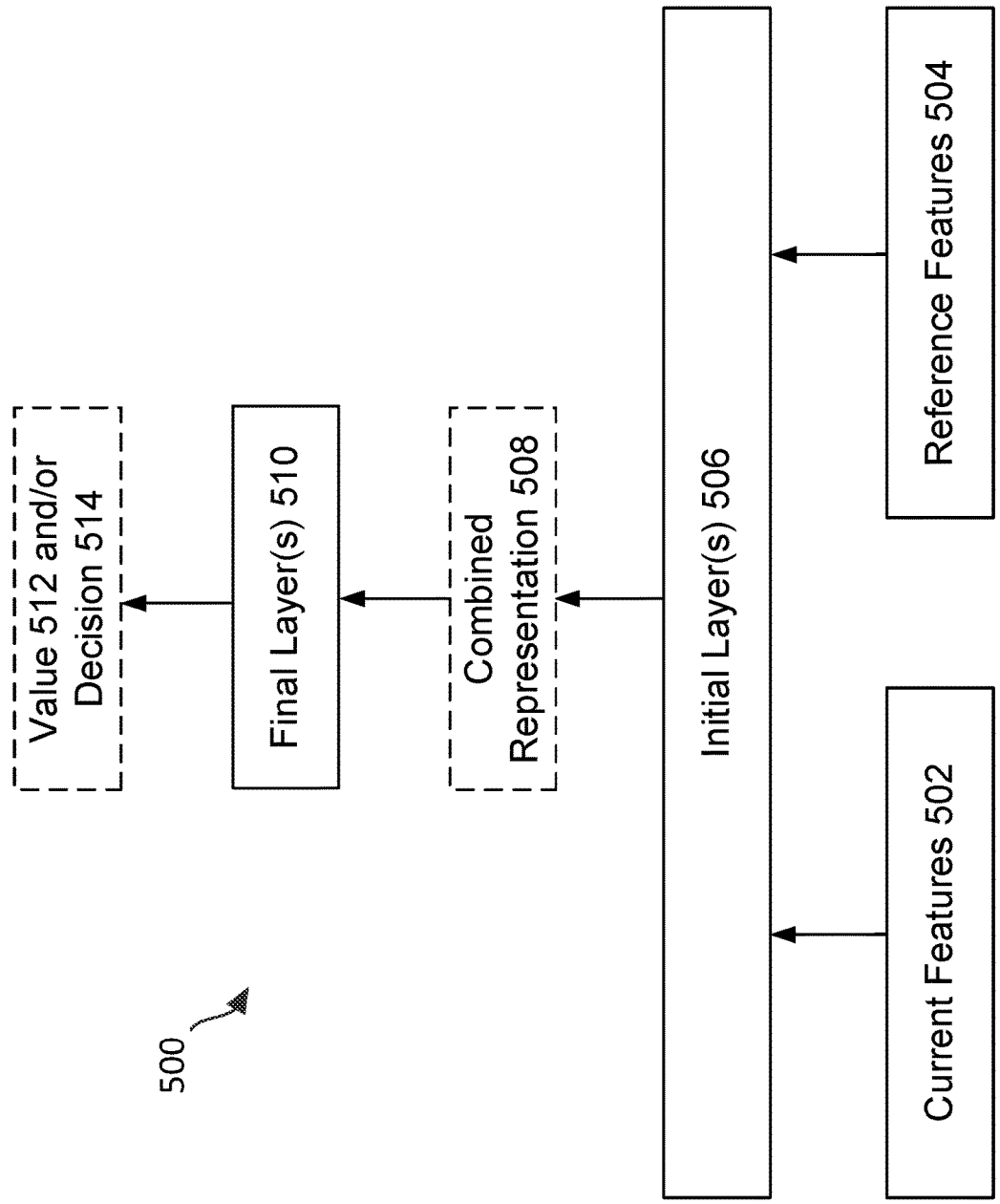
FIG. 5 shows an example model architecture of the example model processing and verification systems shown in FIGS. 1A and 1B.

Referring to FIG. 5, an example architecture of a model 500 configured in accordance with some aspects the present disclosure is shown. The models 116 may incorporate the architecture shown in FIG. 5, which may correspond to an FCNN. As shown, the model 500 may receive current features 502, e.g., determined from the active data 114, and reference features 504, e.g., determined from profile data 112. The current features 502 and the reference features 504 may be input to the model 500 which may include initial layer(s) 506.

In some embodiments, the current features 502 and the reference features 504 may be merged into a single representation. This may be referred to as "early concatenation." As illustrated, the model 500 may combine the current features 502 and the reference features 504 (e.g., via the initial layer(s) 506) to produce a combined representation 508, which may be output from the initial layer(s) 506. The combined representation 508 may thus be an encoded representation of the combination of the current features 502 and the reference features 504. The combined representation 508 may, for example, be a vector of real numbers.

The combined representation 508 may be input to one or more final model layers 510 where a last layer may produce a value 512 (e.g., between "0" and "1") and/or a decision 514. The value 512 may, for example, indicate a probability that the profile data 112 underlying the reference features 504 and the active data 114 underlying the current features 502 reflect the same user (e.g., based on keystrokes and/or mouse movements). In some implementations, a configurable threshold may be used to determine the decision 514 based on the value 512. The decision 514 may indicate whether the same user is reflected in the profile data 112 and the active data 114. The decision 514 may be determined by the model 116 or may be determined by a decision component 118 outside the model 116. For example, a value of "0.5" (or greater) produced from the last layer of the model 116 may be used to determine a decision (e.g., "True") that the same user is reflected in the profile data 112 and the active data 114. A value of less than "0.5" produced from the last layer of the model 116, on the other hand, may be used to determine a decision (e.g., "False") that the same user is not reflected in the profile data 112 and the active data 114.

In some implementations, the combined representation 508 may be sent by the client device 108 to the server(s) 101, e.g., by the representation component 120, for processing by the model 104. In some implementations, the model 104 may include an instance or copy of at least the portion of the model 116 that is used to process the combined representation 508, i.e., the final layer(s) 510. Thus, the server(s) 101 may input the combined representation 508 (received from the client device 108) to the final layer(s) 510 of the model 104. The final layer(s) 510 of the model 104 on the server(s) 101 may produce a value 512, and a decision 514 may be determined, in the same manner as the decision 514 was determined by the client device 108. If the decision 514 determined by the server(s) 101 matches the decision 514 that was determined by the client device 108, the system 100 has likely not been attacked, the decision 514 has likely not been spoofed, and the integrity of the system 100 and its data has likely been maintained.

Figure 6:
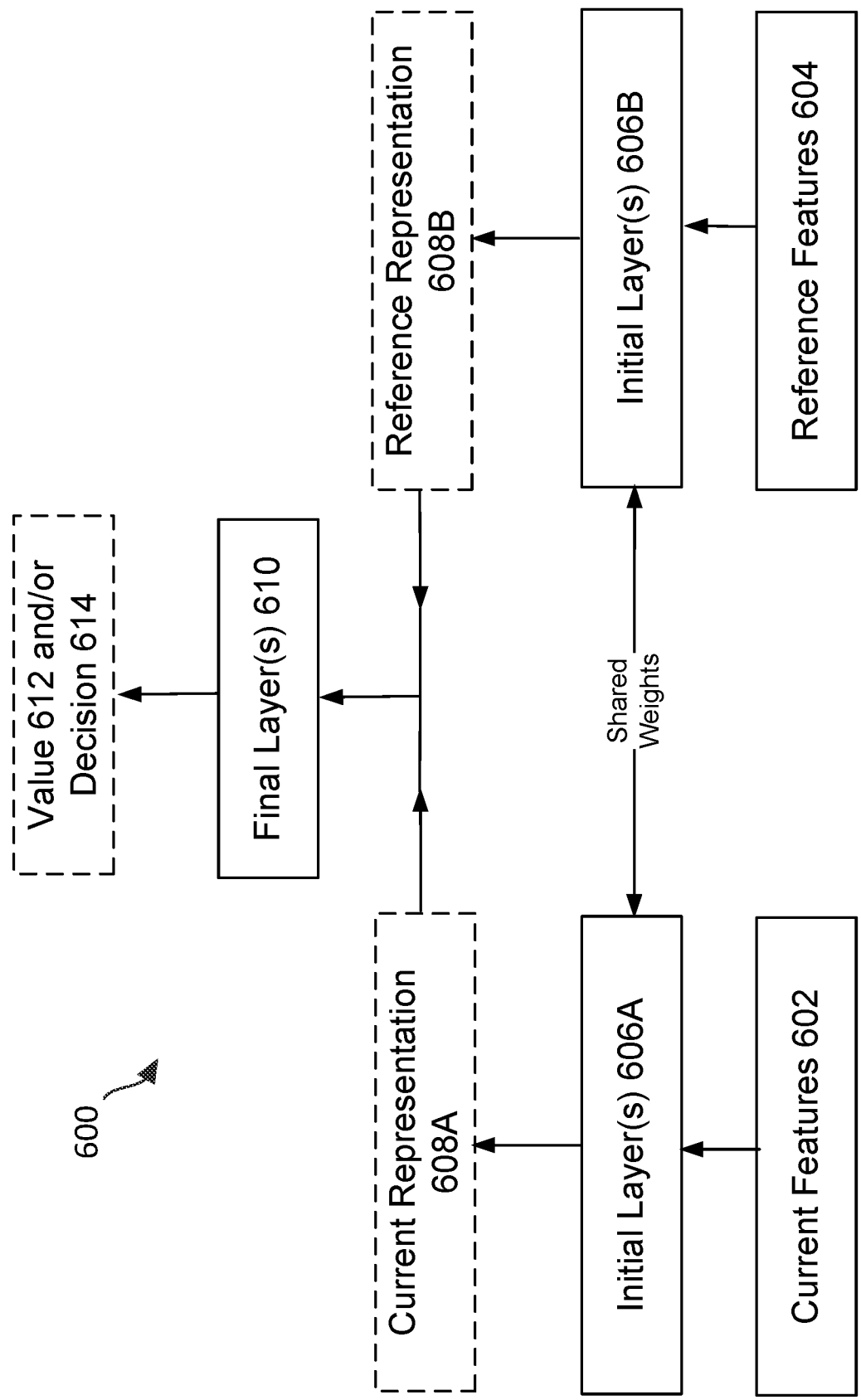
FIG. 6 also shows an example model architecture of the example model processing and verification systems shown in FIGS. 1A and 1B.

In some embodiments, the current features 502 and the reference features 504 may not be merged into a single representation in the manner described above. Referring to FIG. 6, another example architecture of a model 600 configured in accordance with some aspects of the present disclosure is shown. In some implementations, the models 116 may incorporate the architecture shown in FIG. 6, which may correspond to an FCNN. As illustrated in FIG. 6, the model 600 may receive current features 602, e.g., determined from active data 114, and references features 604, e.g., determined from profile data 112. The current features 602 and the reference features 604 may be input to the model 600, which, as illustrated, may include a first set of one or more initial layers 606A and a second set of one or more initial layers 606B, as well as a set of one or more final layers 610.

In some embodiments, the current features 602 and the reference features 604 may separately pass through different branches of a neural network (e.g., the initial layer(s) 606A and the initial layers 606B, respectively) and the interim values from those different branches (e.g., a current representation 608A and a reference representation 608B, respectively) may be merged prior to entering the final layers 610. This may be referred to as "late concatenation." In the illustrated example, the current features 602 are input to the initial layer(s) 606A and the reference features 604 are separately input to the initial layer(s) 606B. The client device 108 may process the current features 602 with the initial layer(s) 606A to produce the current representation 608A. Further, the client device 108 may process the reference features 604 with initial layer(s) 606B to produce the reference representation 608B. The current representation 608A may thus be an encoded representation of the current features 602. The current representation 608A may, for example, be a vector of real numbers.

As shown in FIG. 6, the current representation 608A and the reference representation 608B may be input to the final model layer(s) 610 where a last layer may produce a value 612 (e.g., between "0" and "1") and/or a decision 614. The value 612 may, for example, indicate a probability that the profile data 112 underlying the reference features 804 and the active data 114 underlying the current features 602 reflect the same user (e.g., based on keystrokes and/or mouse movements). In some implementations, a configurable threshold may be used to determine the decision 614 based on the value 612. The decision 614 may indicate whether the same user is reflected in the profile data 112 and the active data 114. The decision 614 may be determined by the model 116 or may be determined by a decision component 118 outside the model 116. For example, a value of "0.5" (or greater) produced from the last layer of the model 116 may be used to determine a decision (e.g., "True") that the same user is reflected in the profile data 112 and the active data 114. A value of less than "0.5" produced from the last layer of the model 116, on the other hand, may be used to determine a decision (e.g., "False") that the same user is not reflected in the profile data 112 and the active data 114.

In some implementations, the current representation 608A may be sent by the client device 108 to the server(s) 101, e.g., by the representation component 120, for processing by the model 104. In some implementations, the model 104 may include an instance or copy of at least the portions of the model 116 that are used: (A) to process the reference features 604 (e.g., based on the profile data 112) to produce the reference representation 608B, e.g., the initial layer(s) 606B, and (B) to process a combination of the current representation 608A and the reference representation 608B to produce the value 612 and/or the decision 614, e.g., the final layer(s) 610. The server(s) 101 may not need to receive the reference representation 608B from the client device 108 because the server(s) 101 may calculate or determine the reference representation 608B by using the layer(s) 606B of the instance or copy of the model 104 stored on the server(s) 101 to process the reference features 604, which may already be stored by the server or calculated or determined from the profile data 112 stored by the server(s) 101.

Thus, the server(s) 101 may input the current representation 608A (received from the client device 108), together with reference representation 608B (determined by the initial layers 606B of the model 104), to the final layer(s) 610 of the model 104. The final layer(s) 610 of the model 104 on the server(s) 101 may produce a value 612, and a decision 614 may be determined, in the same manner as the decision 614 was determined by the client device 108. If the decision 614 determined by the server(s) 101 matches the decision 614 that was determined by the client device 108, the system 100 has likely not been attacked, the decision 614 has likely not been spoofed, and the integrity of the system 100 and its data has likely been maintained.

Figure 7:
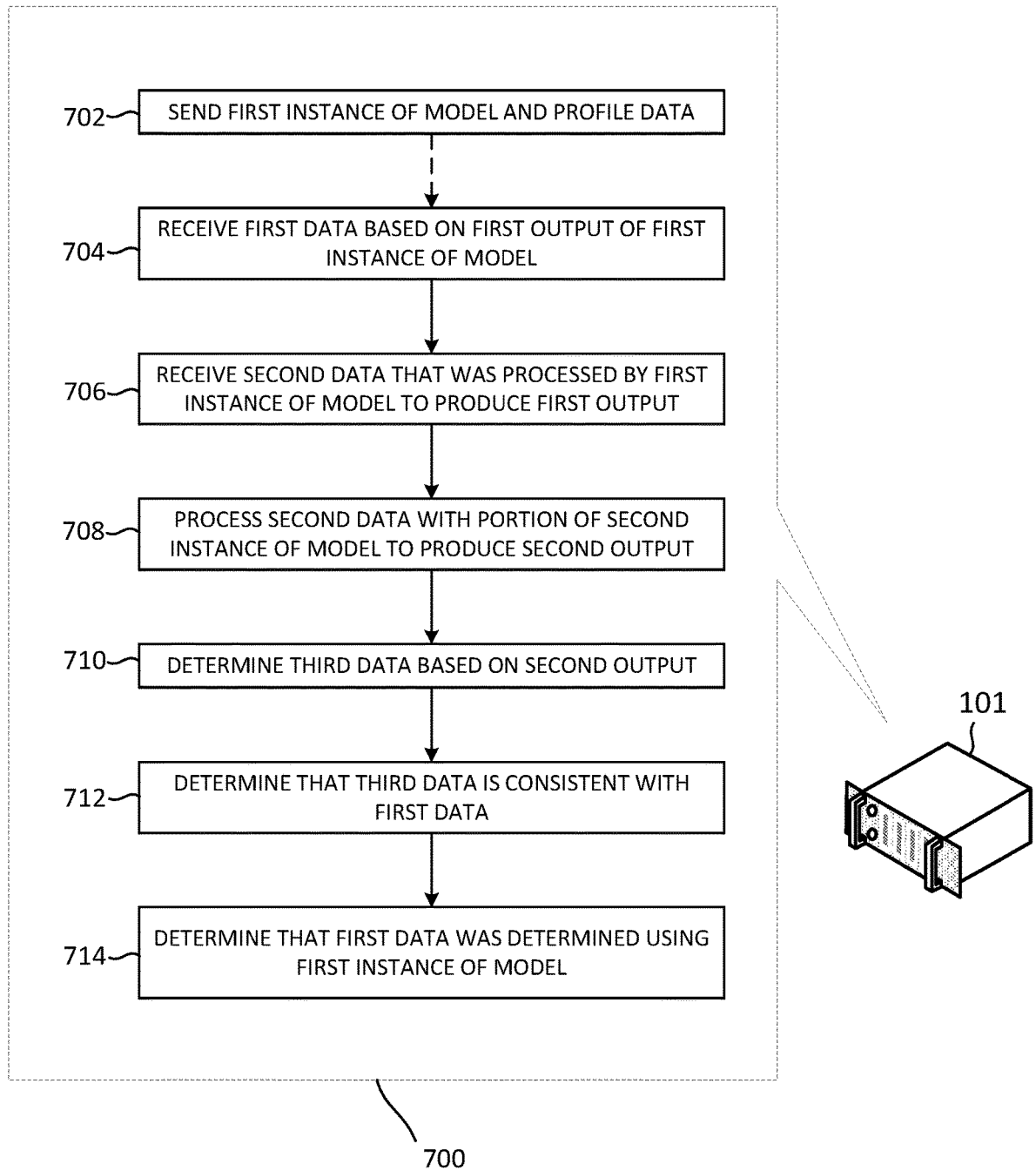
FIG. 7 shows an example model processing and verification process involving example operations in accordance various aspects of the disclosure.

Referring now to FIG. 7, an example model processing and verification process 700 involving example operations in accordance some aspects of the present disclosure is shown. As shown, in some implementations, the process 700 may include sending (702) a first instance of a model (e.g., the model 116) and profile data (e.g., the profile data 112) to a client device (e.g., the client device 108). The method may further include receiving (704) first data (e.g., the value 512, the decision 514, the value 612, or the decision 614, e.g., as indicated by the decision component 118) by a computing system (e.g., the server 101) and from a first device (e.g., the client device 108). The first data (e.g., the value 512, the decision 514, the value 612, or the decision 614) may be based at least in part on a first output (e.g., from final layer(s) 510 or 610) from the first instance of the model (e.g., the model 116) processed by the first device (e.g., the client device 108).

The process 700 may further include receiving (706) second data (e.g., the combined representation 508 or the current representation 608A) by the computing system (e.g., the server 101) and from the first device (e.g., the client device 108). The second data (e.g., the combined representation 508 or the current representation 608A) may have been processed by the first instance of the model (e.g., the model 116) to produce the first output (e.g., from the final layer(s) 510 or 610). The process 700 may also include processing (708) the second data (e.g., the combined representation 508 or the current representation 608A) by the computing system (e.g., the server 101) with at least a portion of a second instance of the model (e.g., the model 104) to produce a second output (e.g., from the final layer(s) 510 or 610 of model 104).

The process 700 may additionally include determining (710) a third data (e.g., the value 512, the decision 514, the value 612, or the decision 614, e.g., as indicated by decision component 106) by the computing system (e.g., the server 101). The third data (e.g., the value 512, the decision 514, the value 612, or the decision 614, e.g., as indicated by decision component 106) may be based at least in part on the second output (e.g., from the final layer(s) 510 or 610 of the model 104).

Further, the process 700 may include determining (712) by the computing system (e.g., the server 101) that the third data (e.g., the value 512, the decision 514, the value 612, or the decision 614, e.g., as indicated by decision component 106) is consistent with the first data (e.g., the value 512, the decision 514, the value 612, or the decision 614, e.g., as indicated by decision component 118). Moreover, the process 700 may include determining (714), based at least in part on the third data being consistent with the first data, that the first data (e.g., the value 512, the decision 514, the value 612, or the decision 614, e.g., as indicated by the decision component 118) was determined using first the instance of the model (e.g., the model 116).

In some embodiments, the first data (e.g., the value 512, the decision 514, the value 612, or the decision 614) may be received by the computing system (e.g., the server 101) from the first device (e.g., the client device 108) based on a first time interval (e.g., N) at which the first data (e.g., the value 512, the decision 514, the value 612, or the decision 614) is sent from the first device (e.g., the client device 108). The computing system (e.g., the server 101) may receive the second data (e.g., the combined representation 508 or the current representation 608A) from the first device (e.g., the client device 108) based on a second time interval (e.g., M) at which the second data (e.g., the combined representation 508 or the current representation 608A) is sent from the first device (e.g., the client device 108). The second time interval (e.g., M) may be the same as or greater than the first time interval (e.g., N).

Further, in some embodiments, the second data (e.g., the combined representation 508 or the current representation 608A) may be based at least in part on a third output (e.g., from the initial layer(s) 506 or 606A). The third output (e.g., from the initial layer(s) 506 or 606A) may be from a portion (e.g., the initial layer(s) 506 or 606A) of the first instance of the model (e.g., the model 116) processed by the first device (e.g., the client device 108). The third output (e.g., from the initial layer(s) 506 or 606A) may be produced based on processing active data (e.g., the active data 114) or input features determined therefrom with the portion (e.g., the initial layer(s) 506 or 606A) of the first instance of the model (e.g., the model 116). Further, the third output (e.g., from the initial layer(s) 606A) may be an encoded representation (e.g., the current representation 608A) of at least a portion of the active data (e.g., the active data 114) or input features determined therefrom. The active data (e.g., the active data 114) may be, at least in part, representative of at least one of keyboard usage data and mouse usage data (e.g., keystrokes, keypresses, mouse dynamics, or mouse movements). The third output (e.g., from the initial layer(s) 506) may be an encoded representation (e.g., the combined representation 508) of profile data (e.g., the profile data 112) merged with active data (e.g., the active data 114), or input features determined therefrom.

Figure 8:
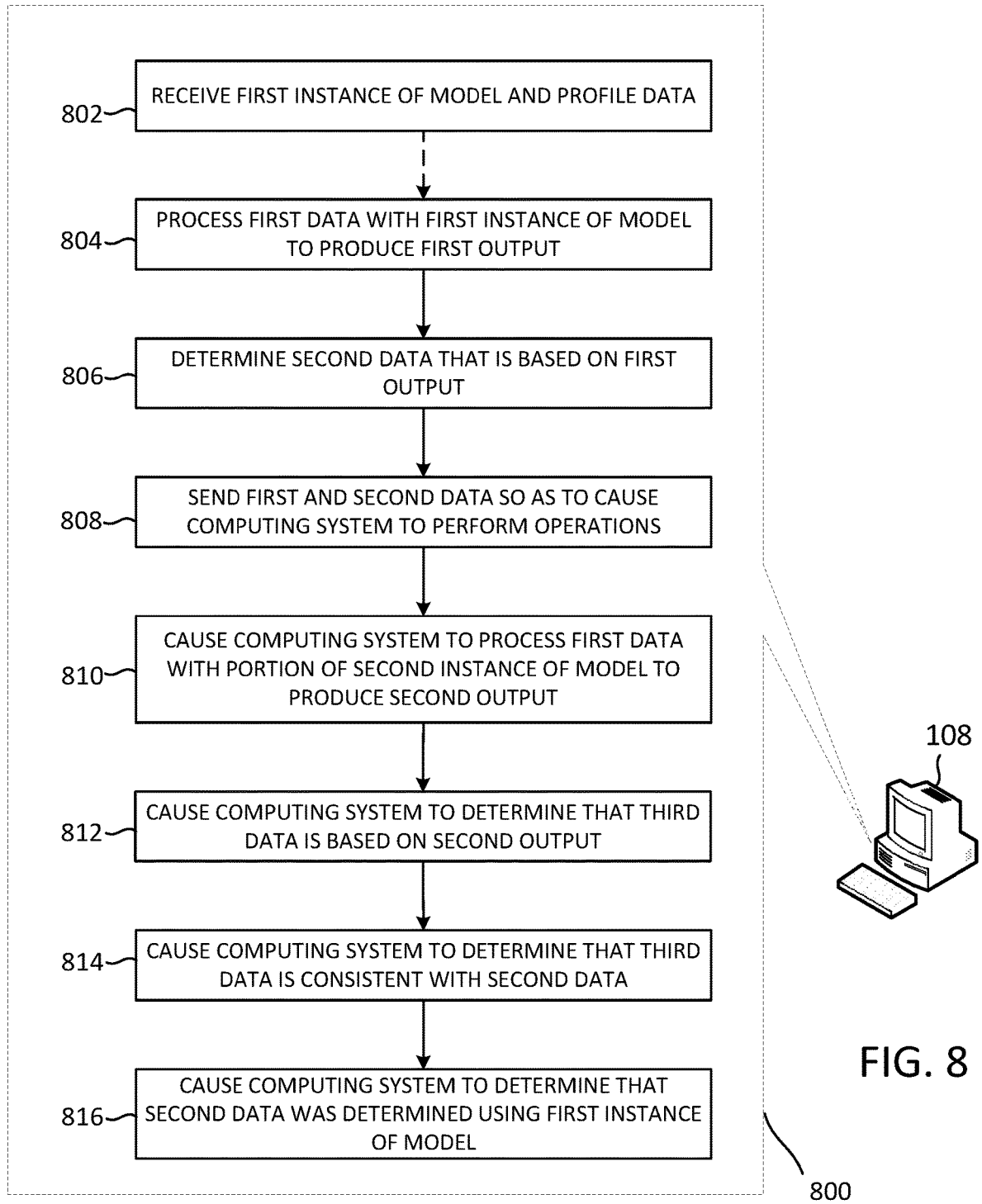
FIG. 8 also shows an example model processing and verification process involving example operations in accordance various aspects of the disclosure.

Referring next to FIG. 8, another example model processing and verification process 800 involving example operations in accordance with some aspects of the present disclosure is shown. As shown, in some embodiments, the process 800 may involve a first device (e.g., the client device 108) receiving (802) a first instance of a model (e.g., the model 116) and profile data (e.g., the profile data 112) from a computing system (e.g., the server(s) 101). The first device (e.g., the client device 108) may process (804) first data (e.g., the combined representation 508 or the current representation 608A) with a first instance of a model (e.g., the model 116) to produce a first output (e.g., from the final layer(s) 510 or 610).

The process 800 may further include determining (806), by the first device (e.g., the client device 108), second data (e.g., the value 512, the decision 514, the value 612, or the decision 614) that is based at least in part on the first output (e.g., from the final layer(s) 510 or 610 of the model 116). The process 800 may also include sending (808), from the first device (e.g., the client device 108) to a computing system (e.g., the server 101), the first data (e.g., the combined representation 508 or the current representation 608A) and the second data (e.g., the value 512, the decision 514, the value 612, or the decision 614) so as to cause the computing system (e.g., the server 101) to perform various operations. In particular, the sending (808) of the first data (e.g., the combined representation 508 or the current representation 608A) and the second data (e.g., the value 512, the decision 514, the value 612, or the decision 614) may cause the computing system (e.g., the server 101) to process (810) the first data (e.g., the combined representation 508 or the current representation 608A) with at least a portion of a second instance of the model (e.g., the model 104) to produce a second output (e.g., from the final layer(s) 510 or 610 of the model 104). Further, the sending (808) of the first data (e.g., the combined representation 508 or the current representation 608A) and the second data (e.g., the value 512, the decision 514, the value 612, or the decision 614) may cause the computing system (e.g., the server 101) to determine (812) third data (e.g., the value 512, the decision 514, the value 612, or the decision 614 from the model 104) based at least in part on the second output (e.g., from the final layer(s) 510 or 610 of the model 104). The sending (808) of the first data (e.g., the combined representation 508 or the current representation 608A) and the second data (e.g., the value 512, the decision 514, the value 612, or the decision 614) may also cause the computing system (e.g., the server 101) to determine (814) that the third data (e.g., the value 512, the decision 514, the value 612, or the decision 614 from the model 104) is consistent with the second data (e.g., the value 512, the decision 514, the value 612, or the decision 614 from the model 116). Additionally, the sending (808) of the first data (e.g., the combined representation 508 or the current representation 608A) and the second data (e.g., the value 512, the decision 514, the value 612, or the decision 614) may also cause the computing system (e.g., the server 101) to determine (816), based at least in part on the third data (e.g., the value 512, the decision 514, the value 612, or the decision 614 from the model 104) being consistent with the second data (e.g., the value 512, the decision 514, the value 612, or the decision 614 from the model 116), that the second data (e.g., the value 512, the decision 514, the value 612, or the decision 614 from the model 116) was determined using the first instance of the model (e.g., the model 116).

In some embodiments, the first device (e.g., the client device 108) may send the second data (e.g., the value 512, the decision 514, the value 612, or the decision 614 from the model 116) to the computing system (e.g., the server 101) based on a first time interval (e.g., N). The first device (e.g., the client device 108) may also send the first data (e.g., the combined representation 508 or the current representation 608A) to the computing system (e.g., the server 101) based on a second time interval (e.g., M). The second time interval (e.g., M) may be the same as or greater than the first time interval (e.g., N).

Further, in some embodiments, the first data (e.g., the combined representation 508 or the current representation 608A) may be based at least in part on a third output (e.g., from the initial layer(s) 506 or 606A). The third output (e.g., from the initial layer(s) 506 or 606A) may be from a portion (e.g., the initial layer(s) 506 or 606A) of the first instance of the model (e.g., the model 116) processed by the first device (e.g., the client device 108). The third output (e.g., from the initial layer(s) 506 or 606A) may be produced based on processing active data (e.g., the active data 114A) or input features determined therefrom with the portion (e.g., the initial layer(s) 506 or 606A) of the first instance of the model (e.g., the model 116). The third output (e.g., from the initial layer(s) 606A) may be an encoded representation (e.g., the current representation 608A) of at least a portion of the active data (e.g., the active data 114) or input features determined therefrom. The active data (e.g., the active data 114) may be, at least in part, representative of at least one of keyboard usage data and mouse usage data (e.g., keystrokes, keypresses, mouse dynamics, or mouse movements). The third output (e.g., from the initial layer(s) 506) may be an encoded representation (e.g., the combined representation 508) of profile data (e.g., the profile data 112) merged with active data (e.g., the active data 114) or input features determined therefrom.

It may be possible for an attacker to view or otherwise access a user's keystrokes or keypresses at the client device or endpoint and attempt to input or replay the keystrokes at the client device or endpoint (or at another device) to spoof the continuous identification system. While it is unlikely that the user types the same sets of keys in the same way (separated by a number of seconds or minutes), it may be possible. Thus, to prevent an attacker from replaying keystrokes, received sets of keystrokes would have to differ from previously received sets of keystrokes, so it may be useful to have a protocol where the server(s) 101 request keystroke information from the client device 108 if such a situation arises.

It may also be possible for an attacker to make it seem as though there are no keystrokes or mouse movements occurring at the client device or endpoint, such that the attacker may physically take over the client device 108 or endpoint 122, or take control of the client device 108 or endpoint 122 with an application designed for attacks. To prevent this type of "blocking" of the keystrokes or mouse movements on the client device 108 or the endpoint 122, if the server(s) 101 determine that the user has not pressed any keys or moved the mouse, the server(s) 101 may verify with a hosting server or another trusted server of the system or platform that no keystrokes or mouse movements were received.

The techniques and features provided in the present disclosure may allow for continuously monitoring user activity patterns (e.g., keystrokes and mouse movements) or other behavior biometrics tracking. Anomalous user behavior may be blocked, or in suspicious situations, the user may be prompted for two-factor authentication or other actions such as session recording. The present disclosure proposes techniques and features to run biometrics (e.g., keystrokes and mouse movements) on the client device 108 which, as discussed above, may ensure security, privacy, and scalability while protecting against spoofing by verifying the correctness of continuous user identification at the server(s) 101.

While examples have been provided in the present disclosure to illustrate how the advantages of the techniques and features provided may be realized, any solution that is based on a model such as a machine learning model or neural network and that can be executed on a client-side device and send a confirmation signal to a server can leverage similar approaches to ensure privacy and security while offering verification by the server.

F. Example Implementations of Methods, Systems, and Computer-Readable Media in Accordance with the Present Disclosure The following paragraphs (M1) through (M18) describe examples of methods that may be implemented in accordance with the present disclosure.

(M1) A method may be performed that involves receiving, by a computing system and from a first device, first data, the first data based at least in part on a first output from a first instance of a model processed by the first device; receiving, by the computing system and from the first device, second data that was processed by the first instance of the model to produce the first output; processing, by the computing system, the second data with at least a portion of a second instance of the model to produce a second output; determining, by the computing system, third data based at least in part on the second output; determining, by the computing system, that the third data is consistent with the first data; and determining, based at least in part on the third data being consistent with the first data, that the first data was determined using the first instance of the model.

(M2) A method may be performed as described in paragraph (M1), and may further involve sending, by the computing system and to the first device, the first instance of the model and profile data.

(M3) A method may be performed as described in paragraph (M1) or paragraph (M2), and may further involve receiving, by the computing system and from the first device, the first data based on a first time interval at which the first data is sent from the first device.

(M4) A method may be performed as described any of paragraphs (M1) through (M3), and may further involve receiving, by the computing system and from the first device, the second data based on a second time interval at which the second data is sent from the first device, the second time interval being longer than the first time interval.

(M5) A method may be performed as described in any of paragraphs (M1) through (M4), wherein the second data is based at least in part on a third output, the third output being from a portion of the first instance of the model processed by the first device.

(M6) A method may be performed as described in any of paragraphs (M1) through (M5), wherein the third output is produced based on processing active data with the portion of the first instance of the model.

(M7) A method may be performed as described in any of paragraphs (M1) through (M6), wherein the third output is an encoded representation of at least a portion of the active data.

(M8) A method may be performed as described in any of paragraphs (M1) through (M7), wherein the active data is, at least in part, representative of at least one of keyboard usage data and mouse usage data.

(M9) A method may be performed as described in any of paragraphs (M1) through (M8), wherein the third output is an encoded representation of profile data merged with active data.

(M10) A method may be performed that involves processing, by a first device, first data with a first instance of a model to produce a first output; determining, by the first device, second data that is based at least in part on the first output; sending, from the first device to a computing system, the first data and the second data so as to cause the computing system to: process the first data with at least a portion of a second instance of the model to produce a second output, determine third data based at least in part on the second output, determine that the third data is consistent with the second data, and determine, based at least in part on the third data being consistent with the second data, that the second data was determined using the first instance of the model.

(M11) A method may be performed as described in paragraph (M10), and may further involve receiving, by the first device and from the computing system, the first instance of the model and profile data.

(M12) A method may be performed as described in paragraph (M10) or paragraph (M11), and may further involve sending, by the first device and to the computing system, the second data based on a first time interval.

(M13) A method may be performed as described any of paragraphs (M10) through (M12), and may further involve sending, by the first device and to the computing system, the first data based on a second time interval, the second time interval being longer than the first time interval.

(M14) A method may be performed as described in any of paragraphs (M10) through (M13), wherein the first data is based at least in part on a third output, the third output being from a portion of the first instance of the model processed by the first device.

(M15) A method may be performed as described in any of paragraphs (M10) through (M14), wherein the third output is produced based on processing active data with the portion of the first instance of the model.

(M16) A method may be performed as described in any of paragraphs (M10) through (M15), wherein the third output is an encoded representation of at least a portion of the active data.

(M17) A method may be performed as described in any of paragraphs (M10) through (M6), wherein the active data is, at least in part, representative of at least one of keyboard usage data and mouse usage data.

(M18) A method may be performed as described in any of paragraphs (M1) through (M17), wherein the third output is an encoded representation of profile data merged with active data.

The following paragraphs (S1) through (S18) describe examples of systems and devices that may be implemented in accordance with the present disclosure.

(S1) A computing system may comprise at least one processor and at least one computer-readable medium encoded with instructions which, when executed by the at least one processor, cause the computing system to receive, from a first device, first data, the first data based at least in part on a first output from a first instance of a model processed by the first device; receive, from the first device, second data that was processed by the first instance of the model to produce the first output; process the second data with at least a portion of a second instance of the model to produce a second output; determine third data based at least in part on the second output; determine that the third data is consistent with the first data; and determine, based at least in part on the third data being consistent with the first data, that the first data was determined using the first instance of the model.

(2) A computing system may be configured as described in paragraph (S1), wherein the at least one computer-readable medium may be encoded with additional instructions which, when executed by the at least one processor, further cause the computing system to send, to the first device, the first instance of the model and profile data.

(S3) A computing system may be configured as described in paragraph (S1) or paragraph (2), wherein the at least one computer-readable medium may be encoded with additional instructions which, when executed by the at least one processor, further cause the computing system to receive, from the first device, the first data based on a first time interval at which the first data is sent from the first device.

(S4) A computing system may be configured as described in any of paragraph (S1) through (S3), wherein the at least one computer-readable medium may be encoded with additional instructions which, when executed by the at least one processor, further cause the computing system to receive, from the first device, the second data based on a second time interval at which the second data is sent from the first device, the second time interval being longer than the first time interval.

(S5) A computing system may be configured as described in any of paragraph (S1) through (S4), wherein the second data is based at least in part on a third output, the third output being from a portion of the first instance of the model processed by the first device.

(S6) A computing system may be configured as described in any of paragraph (S1) through (S5), wherein the third output is produced based on processing active data with the portion of the first instance of the model.

(S7) A computing system may be configured as described in any of paragraph (S1) through (S6), wherein the third output is an encoded representation of at least a portion of the active data.

(S8) A computing system may be configured as described in any of paragraph (S1) through (S7), wherein the active data is, at least in part, representative of at least one of keyboard usage data and mouse usage data.

(S9) A computing system may be configured as described in any of paragraph (S1) through (S8), wherein the third output is an encoded representation of profile data merged with active data.

(S10) A first device may comprise at least one processor and at least one computer-readable medium encoded with instructions which, when executed by the at least one processor, cause the first device to process first data with a first instance of a model to produce a first output; determine second data that is based at least in part on the first output; send, to a computing system, the first data and the second data so as to cause the computing system to: process the first data with at least a portion of a second instance of the model to produce a second output, determine third data based at least in part on the second output, determine that the third data is consistent with the second data, and determine, based at least in part on the third data being consistent with the second data, that the second data was determined using the first instance of the model.

(S11) A first device may be configured as described in paragraph (S1), wherein the at least one computer-readable medium may be encoded with additional instructions which, when executed by the at least one processor, further cause the first device to receive, from the computing system, the first instance of the model and profile data.

(S12) A first device may be configured as described in paragraph (S10) or paragraph (S11), wherein the at least one computer-readable medium may be encoded with additional instructions which, when executed by the at least one processor, further cause the first device to send, to the computing system, the second data based on a first time interval.

(S13) A first device may be configured as described in any of paragraphs (S10) through (S12), wherein the at least one computer-readable medium may be encoded with additional instructions which, when executed by the at least one processor, further cause the first device to send, to the computing system, the first data based on a second time interval, the second time interval being longer than the first time interval.

(S14) A first device may be configured as described in any of paragraphs (S10) through (S13), wherein the first data is based at least in part on a third output, the third output being from a portion of the first instance of the model processed by the first device.

(S15) A first device may be configured as described in any of paragraphs (S10) through (S14), wherein the third output is produced based on processing active data with the portion of the first instance of the model.

(S16) A first device may be configured as described in any of paragraphs (S10) through (S15), wherein the third output is an encoded representation of at least a portion of the active data.

(S17) A first device may be configured as described in any of paragraphs (S10) through (S16), wherein the active data is, at least in part, representative of at least one of keyboard usage data and mouse usage data.

(S18) A first device may be configured as described in any of paragraphs (S10) through (S17), wherein the third output is an encoded representation of profile data merged with active data.

The following paragraphs (CRM1) through (CRM18) describe examples of computer-readable media that may be implemented in accordance with the present disclosure.

(CRM1) At least one non-transitory, computer-readable medium may be encoded with instructions which, when executed by at least one processor included in a computing system, cause the computing system to receive, from a first device, first data, the first data based at least in part on a first output from a first instance of a model processed by the first device; receive, from the first device, second data that was processed by the first instance of the model to produce the first output; process the second data with at least a portion of a second instance of the model to produce a second output; determine third data based at least in part on the second output; determine that the third data is consistent with the first data; and determine, based at least in part on the third data being consistent with the first data, that the first data was determined using the first instance of the model.

(CRM2) At least one non-transitory, computer-readable medium may be configured as described in paragraph (CRM1), and may be encoded with additional instructions which, when executed by the at least one processor, further cause the computing system to send, to the first device, the first instance of the model and profile data.

(CRM3) At least one non-transitory, computer-readable medium may be configured as described in paragraph (CRM1) or paragraph (CRM2), and may be encoded with additional instructions which, when executed by the at least one processor, further cause the computing system to receive, from the first device, the first data based on a first time interval at which the first data is sent from the first device.

(CRM4) At least one non-transitory, computer-readable medium may be configured as described in any of paragraphs (CRM1) through (CRM3), and may be encoded with additional instructions which, when executed by the at least one processor, further cause the computing system to receive, from the first device, the second data based on a second time interval at which the second data is sent from the first device, the second time interval being longer than the first time interval.

(CRM5) At least one non-transitory, computer-readable medium may be configured as described in any of paragraphs (CRM1) through (CRM4), wherein the second data is based at least in part on a third output, the third output being from a portion of the first instance of the model processed by the first device.

(CRM6) At least one non-transitory, computer-readable medium may be configured as described in any of paragraphs (CRM1) through (CRM5), wherein the third output is produced based on processing active data with the portion of the first instance of the model.

(CRM7) At least one non-transitory, computer-readable medium may be configured as described in any of paragraphs (CRM1) through (CRM6), wherein the third output is an encoded representation of at least a portion of the active data.

(CRM8) At least one non-transitory, computer-readable medium may be configured as described in any of paragraphs (CRM1) through (CRM7), wherein the active data is, at least in part, representative of at least one of keyboard usage data and mouse usage data.

(CRM9) At least one non-transitory, computer-readable medium may be configured as described in any of paragraphs (CRM1) through (CRM8), wherein the third output is an encoded representation of profile data merged with active data.

(CRM10) At least one non-transitory, computer-readable medium may be encoded with instructions which, when executed by at least one processor included in a first device, cause the first device to process first data with a first instance of a model to produce a first output; determine second data that is based at least in part on the first output; send, to a computing system, the first data and the second data so as to cause the computing system to: process the first data with at least a portion of a second instance of the model to produce a second output, determine third data based at least in part on the second output, determine that the third data is consistent with the second data, and determine, based at least in part on the third data being consistent with the second data, that the second data was determined using the first instance of the model.

(CRM11) At least one non-transitory, computer-readable medium may be configured as described in paragraph (CRM10), and may be encoded with additional instructions which, when executed by the at least one processor, further cause the first device to receive, from the computing system, the first instance of the model and profile data.

(CRM12) At least one non-transitory, computer-readable medium may be configured as described in paragraph (CRM10) or paragraph (CRM11), and may be encoded with additional instructions which, when executed by the at least one processor, further cause the first device to send, to the computing system, the second data based on a first time interval.

(CRM13) At least one non-transitory, computer-readable medium may be configured as described in any of paragraphs (CRM10) through (CRM12), and may be encoded with additional instructions which, when executed by the at least one processor, further cause the first device to send, to the computing system, the first data based on a second time interval, the second time interval being longer than the first time interval.

(CRM14) At least one non-transitory, computer-readable medium may be configured as described in any of paragraphs (CRM10) through (CRM13), wherein the first data is based at least in part on a third output, the third output being from a portion of the first instance of the model processed by the first device.

(CRM15) At least one non-transitory, computer-readable medium may be configured as described in any of paragraphs (CRM10) through (CRM14), wherein the third output is produced based on processing active data with the portion of the first instance of the model.

(CRM16) At least one non-transitory, computer-readable medium may be configured as described in any of paragraphs (CRM10) through (CRM15), wherein the third output is an encoded representation of at least a portion of the active data.

(CRM17) At least one non-transitory, computer-readable medium may be configured as described in any of paragraphs (CRM10) through (CRM16), wherein the active data is, at least in part, representative of at least one of keyboard usage data and mouse usage data.

(CRM19) At least one non-transitory, computer-readable medium may be configured as described in any of paragraphs (CRM10) through (CRM17), wherein the third output is an encoded representation of profile data merged with active data.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    receiving, by a computing system and from a first device, a first verification decision, the first verification decision based at least in part on a first output from a first instance of a model processed by the first device, the model having a first portion and a second portion;
    receiving, by the computing system and from the first device, a second output that was processed by the first instance of the second portion of the model to produce the first output, the second output being partially processed output from the first portion of the first instance of the model processed by the first device;
    processing, by the computing system, the second output with a second instance of the second portion of the model to produce a third output;
    determining, by the computing system, a second verification decision based at least in part on the third output;
    determining, by the computing system, that the second verification decision is consistent with the first verification decision; and
    determining, based at least in part on the second verification decision being consistent with the first verification decision, that the first verification decision was determined using the first instance of the model.

2. The method of claim 1, further comprising:
    sending, by the computing system and to the first device, the first instance of the model and profile data.

3. The method of claim 1, further comprising:
    receiving, by the computing system and from the first device, the first verification decision based on a first time interval at which the first verification decision is sent from the first device.

4. The method of claim 3, further comprising:
    receiving, by the computing system and from the first device, the second output based on a second time interval at which the second output is sent from the first device, the second time interval being longer than the first time interval.

5. The method of claim 1, wherein the second output is produced based on processing active data with the first portion of the first instance of the model.

6. The method of claim 5, wherein the second output is an encoded representation of at least a portion of the active data.

7. The method of claim 5, wherein the active data is, at least in part, representative of at least one of keyboard usage data and mouse usage data.

8. The method of claim 1, wherein the second output is an encoded representation of profile data merged with active data.

9. A method, comprising:
    processing, by a first device, active data with a first portion of a first instance of a model to produce first data;
    processing, by the first device, the first data with a second portion of the first instance of the model to produce a first output;
    determining, by the first device, a first verification decision that is based at least in part on the first output;

sending, from the first device to a computing system, the first data and the first verification decision so as to cause the computing system to:
  process the first data with the second portion of a second instance of the model to produce a second output,
  determine a second verification decision based at least in part on the second output,
  determine that the second verification decision is consistent with the first verification decision, and
  determine, based at least in part on the second verification decision being consistent with the first verification decision, that the first verification decision was determined using the second portion of the first instance of the model.

10. The method of claim 9, further comprising:
receiving, by the first device and from the computing system, the first instance of the model and profile data.

11. The method of claim 9, further comprising:
sending, by the first device and to the computing system, the first verification decision based on a first time interval.

12. The method of claim 11, further comprising:
sending, by the first device and to the computing system, the first data based on a second time interval, the second time interval being longer than the first time interval.

13. The method of claim 9, wherein the first data is an encoded representation of at least a portion of the active data.

14. The method of claim 9, wherein the active data is, at least in part, representative of at least one of keyboard usage data and mouse usage data.

15. The method of claim 9, wherein the first data is an encoded representation of profile data merged with active data.

16. A computing system, comprising:
at least one processor; and
at least one computer-readable medium encoded with instructions which, when executed by the at least one processor, cause the computing system to:
  receive, from a first device, a first verification decision, the first verification decision based at least in part on a first output from a first instance of a model processed by the first device, the model having a first portion and a second portion,
  receive, from the first device, a second output that was processed by the first instance of the second portion of the model to produce the first output, the second output being partially processed output from the first portion of the first instance of the model processed by the first device,
  process the second output with a second instance of the second portion of the model to produce a third output,
  determine a second verification decision based at least in part on the third output,
  determine that the second verification decision is consistent with the first verification decision, and
  determine, based at least in part on the second verification decision being consistent with the first verification decision, that the first verification decision was determined using the first instance of the model.

17. The computing system of claim 16, wherein the at least one computer-readable medium is further encoded with additional instructions which, when executed by the at least one processor, further cause the computing system to:
  send, to the first device, the first instance of the model and profile data.

* * * * *